United States Patent
Naka et al.

(10) Patent No.: US 8,631,245 B2
(45) Date of Patent: Jan. 14, 2014

(54) INFORMATION PROCESSING APPARATUS, CONTROL METHOD AND COMPUTER-READABLE MEDIUM

(75) Inventors: Akiteru Naka, Machida (JP); Yutaka Myoki, Yokohama (JP); Naohiro Isobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 12/903,488

(22) Filed: Oct. 13, 2010

(65) Prior Publication Data

US 2011/0107110 A1    May 5, 2011

(30) Foreign Application Priority Data

Nov. 5, 2009   (JP) ................................. 2009-254451

(51) Int. Cl.
*G06F 21/00* (2013.01)

(52) U.S. Cl.
USPC ......................................................... 713/189

(58) Field of Classification Search
USPC ....................................................... 713/189
See application file for complete search history.

(56) References Cited

U.S. PATENT DOCUMENTS

| | | | |
|---|---|---|---|
| 2006/0174194 A1 | 8/2006 | Miyazawa | |
| 2007/0216934 A1* | 9/2007 | Yamada | 358/1.15 |
| 2008/0152224 A1* | 6/2008 | MacKenzie | 382/187 |
| 2010/0023746 A1 | 1/2010 | Imamoto | |
| 2010/0095131 A1* | 4/2010 | Krueger et al. | 713/189 |
| 2011/0055687 A1* | 3/2011 | Bhandar et al. | 715/235 |

FOREIGN PATENT DOCUMENTS

| | | |
|---|---|---|
| JP | 2006209663 | 8/2006 |
| JP | 2007226660 A | 9/2007 |
| JP | 2007257527 A | 10/2007 |
| JP | 2008-159029 | 7/2008 |

\* cited by examiner

*Primary Examiner* — Brandon Hoffman
*Assistant Examiner* — Anthony Brown
(74) *Attorney, Agent, or Firm* — Fitzpatrick, Cella, Harper & Scinto

(57) ABSTRACT

An information processing apparatus that performs mapping of a data field in a database to a document template holding a variable area according to a mapping rule defined in the variable area, thereby generating print data for each record in the database, the information processing apparatus comprises: an accepting unit configured to accept designation from a user regarding whether or not to perform encryption of the data field referred to by the mapping rule, for each data field; a determination unit configured to determine whether or not to encrypt content that is to be applied to the variable area based on the data field for which encryption designation is accepted by the accepting unit and the mapping rule; and a generation unit configured to encrypt the content that is to be applied to the variable area and that is determined to be encrypted by the determination unit.

15 Claims, 14 Drawing Sheets

FIG. 4

| ID 401 | last_name 404 | first_name 405 | address1 406 | address2 407 | child 408 | child1_name 409 | ... | visit_shop 410 | visit_time 411 | buy_item 412 | Image0 413 |
|---|---|---|---|---|---|---|---|---|---|---|---|
| 001 | TANAKA | ICHIRO | TOKYO | X_Y_Z, XY-WARD | 1 | HANAKO | ... | SHOP XY | 20 | TROUSERS | IMAGE2.JPG |
| 002 | SATO | JIRO | SAITAMA | X_Y_Z, XY-CITY | 2 | TARO | ... | SHOP YZ | 2 | T-SHIRT | IMAGE1.JPG |
| ... | | | | | | | | | | | |

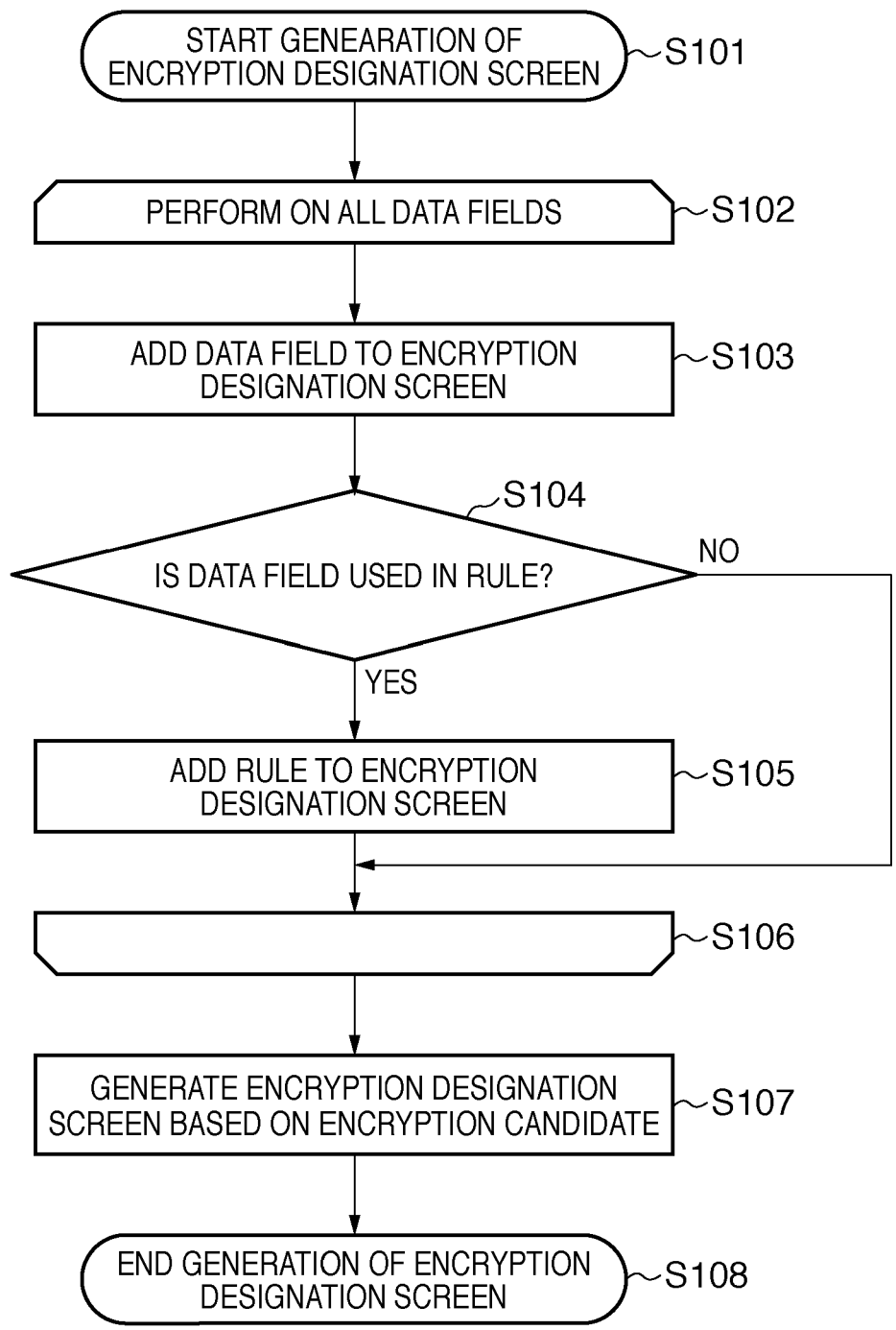

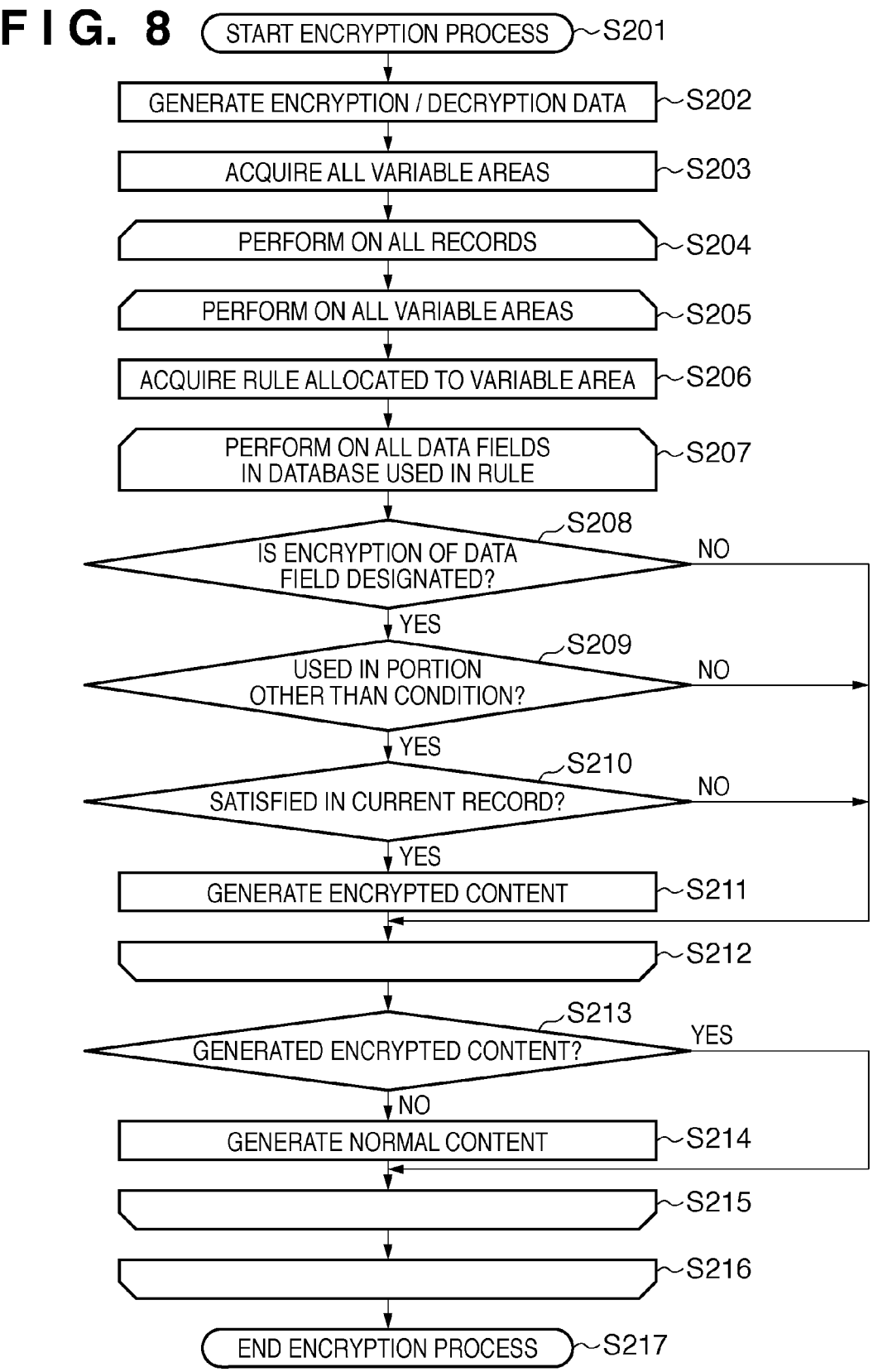

F I G. 10

```
<DOCUMENT_SET>
  <DOCUMENT>
    <PAGE>
      <ADDRESS>                                            ~901
        <ALTERNATIVE OBJECT Src="proxy.pdf"/>
        <ENCRYPTED OBJECT Src="addr_1.data"/>
      </ADDRESS>
      <NAME 1>                                             ~902
        <ALTERNATIVE OBJECT Src="proxy.pdf"/>
        <ENCRYPTED OBJECT Src="name1_1.data"/>
      </NAME 1>
      <NAME 2>                                             ~903
        <ALTERNATIVE OBJECT Src="proxy.pdf"/>
        <ENCRYPTED OBJECT Src="name2_1.data"/>
      </NAME 2>
      <INFORMATION 1>                                      ~904
        <OBJECT Src="map_1.pdf"/>
      </INFORMATION 1>
      <NAME 3>                                             ~905
        <ALTERNATIVE OBJECT Src="proxy.pdf"/>
        <ENCRYPTED OBJECT Src="name3_1.data"/>
      </NAME 3>
    </PAGE>
  </DOCUMENT>
  <DOCUMENT>
    <PAGE>
      <ADDRESS>                                            ~906
        <ALTERNATIVE OBJECT Src="proxy.pdf"/>
        <ENCRYPTED OBJECT Src="addr_2.data"/>
      </ADDRESS>
      <NAME 1>                                             ~907
        <ALTERNATIVE OBJECT Src="proxy.pdf"/>
        <ENCRYPTED OBJECT Src="name1_2.data"/>
      </NAME 1>
      <NAME 2>                                             ~908
        <OBJECT Src="and the family.pdf"/>
      </NAME 2>
      <INFORMATION 1>                                      ~909
        <OBJECT Src="item_2.pdf"/>
      </INFORMATION 1>
      <NAME 3>                                             ~910
        <ALTERNATIVE OBJECT Src="proxy.pdf"/>
        <ENCRYPTED OBJECT Src="name3_2.data"/>
      </NAME 3>
    </PAGE>
  </DOCUMENT>
</DOCUMENT_SET>
```

INFORMATION PROCESSING APPARATUS, CONTROL METHOD AND COMPUTER-READABLE MEDIUM

BACKGROUND OF THE INVENTION

1. Field of the Invention

The present invention relates to an information processing apparatus, a control method, and a computer-readable medium. In particular, the present invention relates to an improvement of efficiency in the case where encryption is designated for a document that can be printed by variable data printing.

2. Description of the Related Art

As printing systems for the POD (print on demand) market are becoming widely used, variable data printing that customizes a print document for each customer and performs printing has been attracting attention. With the variable data printing, personal sales promotion suitable for each person using customer data can be performed. In order to perform the variable data printing, a database in which personal information for each customer and the like are gathered, and a template to which actual content data present in the database is inserted (hereinafter, referred to as a "document template") are necessary. The document template is designed by combining a portion in which content data inserted at the time of printing is not changed (hereinafter, referred to as a "fixed area"), and a portion in which content data inserted at the time of printing is changed for each record in the database (hereinafter, referred to as a "variable area"). Furthermore, at the time of printing, the content data is inserted to each area for each record registered in the database, and, thus, print data for each customer is created from the print document, and actually printed. In this manner, the variable data printing is performed using a database in which customer information (content data) is registered, and a document template based on which a design of a printed result is determined. Furthermore, in the case of a print document relating to customer information in this manner, security has to be sufficiently considered such that the personal information is not leaked. Meanwhile, it is also necessary to make an arrangement to show how the designed result will be printed.

Conventionally, techniques are disclosed that prevent personal information from being leaked without changing layout information. A technique is disclosed that performs encryption after separating layout data and personal information, and performs decryption at the time of output (see Japanese Patent Laid-Open No. 2008-159029, for example). Furthermore, a technique is disclosed that performs a masking process on the variable area, thereby protecting personal information and the like without damaging layout information (see Japanese Patent Laid-Open No. 2006-209663, for example).

Conventionally, a function to perform encryption without changing layout information is provided. However, in the case where a plurality of variable areas are present, and content data in a database is inserted to the plurality of variable areas, there are problems where incomplete designation occurs in encryption of the variable areas and in which effort is required to perform designation. Furthermore, unnecessary encryption wastes the time required to perform encryption and decryption.

SUMMARY OF THE INVENTION

The present invention was made in order to solve the above-described problems, and provides an information processing apparatus having an efficient encryption designation method that can reduce incomplete encryption designation without changing layout information.

According to one aspect of the present invention, there is provided an information processing apparatus that performs mapping of a data field in a database to a document template holding a variable area according to a mapping rule defined in the variable area, thereby generating print data for each record in the database, the information processing apparatus comprising: an accepting unit configured to accept designation from a user regarding whether or not to perform encryption of the data field referred to by the mapping rule, for each data field; a determination unit configured to determine whether or not to encrypt content that is to be applied to the variable area based on the data field for which encryption designation is accepted by the accepting unit and the mapping rule; and a generation unit configured to encrypt the content that is to be applied to the variable area and that is determined to be encrypted by the determination unit.

According to another aspect of the present invention, there is provided a method for controlling an information processing apparatus that performs mapping of a data field in a database to a document template holding a variable area according to a mapping rule defined in the variable area, thereby generating print data for each record in the database, the method comprising the steps of: accepting designation from a user regarding whether or not to perform encryption of the data field referred to by the mapping rule, for each data field; determining whether or not to encrypt content that is to be applied to the variable area based on the data field for which encryption designation is accepted in the accepting step and the mapping rule; and generating encrypted content that is to be applied to the variable area and that is determined to be encrypted in the determining step.

According to another aspect of the present invention, there is provided a computer-readable medium storing a program for causing a computer to function as: an accepting unit configured to accept designation from a user regarding whether or not to perform encryption of a data field referred to by a mapping rule, for each data field; a determination unit configured to determine whether or not to encrypt content that is to be applied to a variable area based on the data field for which encryption designation is accepted by the accepting unit and the mapping rule; and a generation unit configured to encrypt the content that is to be applied to the variable area and that is determined to be encrypted by the determination unit.

Accordingly, encryption settings by a user can be prevented from being incomplete, and usability can be improved. Furthermore, only portions that have to be encrypted are encrypted, and, thus, the load of encryption and decryption processes can be reduced.

Further features of the present invention will become apparent from the following description of exemplary embodiments with reference to the attached drawings.

BRIEF DESCRIPTION OF THE DRAWINGS

FIG. 4 is an illustration relating to a database according to this embodiment.

FIG. 6 is a flowchart relating to generation of an encryption designation screen according to this embodiment.

FIG. 8 is a flowchart relating to generation of a print document according to this embodiment.

FIG. 10 is an illustration of an encrypted print document according to this embodiment.

DESCRIPTION OF THE EMBODIMENTS

First Embodiment

Figure 1:
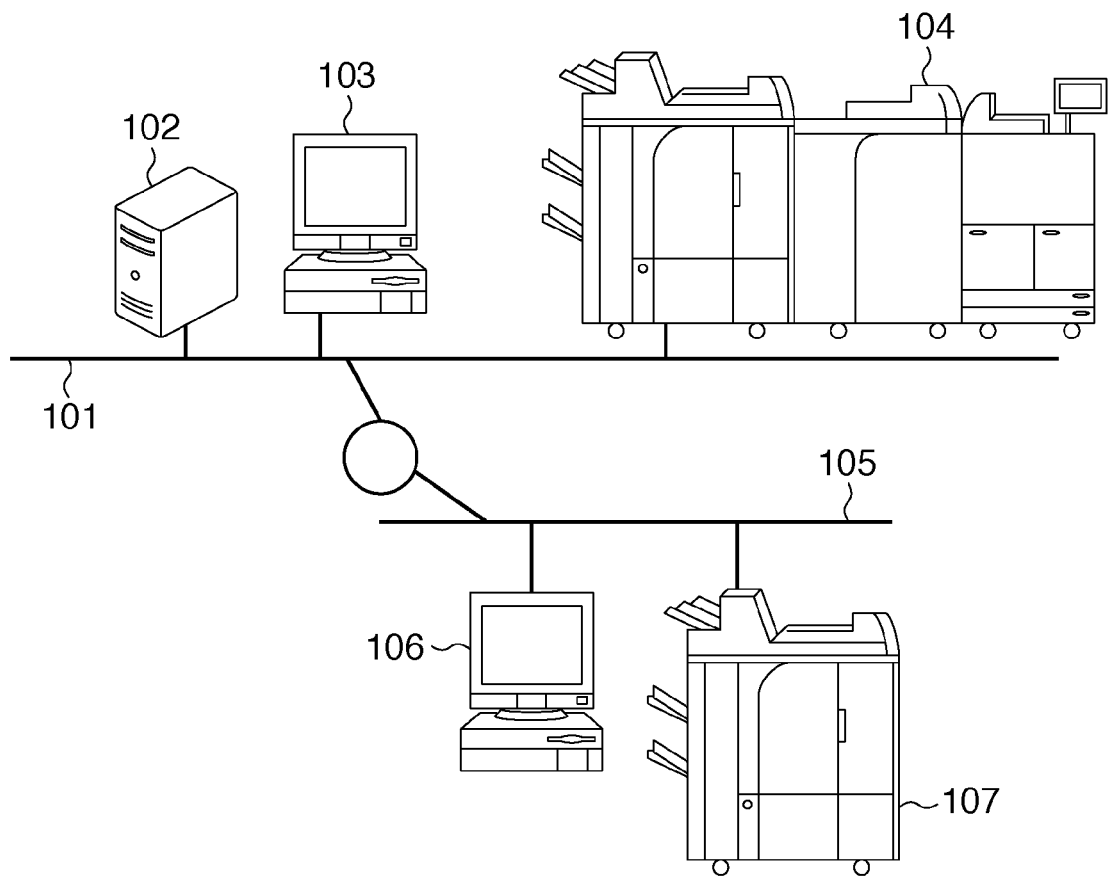
FIG. 1 is a configuration diagram of a POD system according to an embodiment.

FIG. 1 is a schematic diagram showing the configuration of a POD system including a printing system according to an embodiment of the present invention. This POD system has a server computer 102, a client computer 103 functioning as an information processing apparatus, and a printing apparatus 104, and these constituent components are connected via a network 101. The server computer 102 manages data exchange with various apparatuses connected to the network 101. The client computer 103 transmits image data via the network 101 to the printing apparatus 104 or the server computer 102. Upon receipt of the image data, the printing apparatus 104 communicates with the server computer 102 as necessary, and starts printing. Furthermore, the image data generated by the client computer 103 is transmitted via the network 101 to another client computer 106 belonging to a network 105 that is different from the network 101 to which the server computer 102 belongs. Furthermore, a printing apparatus 107 belonging to the network 105 can also print the image data.

Figure 2:
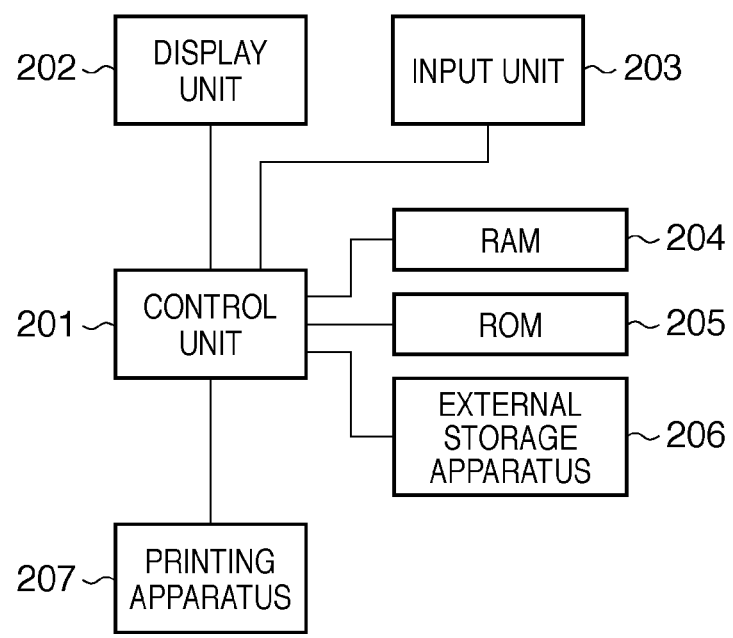
FIG. 2 is a block diagram showing the configuration of an information processing apparatus according to this embodiment.

FIG. 2 is a block diagram showing the configuration of the information processing apparatus according to this embodiment. A control unit 201 is, for example, a CPU, and controls a display unit 202, an input unit 203, and the like. Accordingly, the processes of the process flow described below are realized by the control unit 201 loading and executing program code stored in a RAM 204, a ROM 205, an external storage apparatus 206, or the like. The display unit 202 is a display apparatus such as a CRT or a liquid crystal monitor. The input unit 203 corresponds to a keyboard or a pointing device such as a mouse. The RAM 204 is a non-volatile high-capacity memory, and stores various types of program code or data files loaded from the ROM 205. The ROM 205 stores computer programs executed by the control unit 201. The external storage apparatus 206 is configured from a hard disk and a driving unit that reads and writes data from and to the hard disk, can exchange data stored in another hard disk via a network, and stores data necessary for printing. A printing apparatus 207 can exchange data via a network, a cable, or the like. An OS stored in the RAM 204 controls an input process from the input unit 203 and an execution process of various applications.

In this embodiment, the description is made based on the assumption that program code is loaded onto the RAM 204, but the program code can be directly executed from the ROM 205. Furthermore, the description is made based on the assumption that each piece of data that is to be processed exists on the RAM 204, but the data can be disposed on the external storage apparatus 206, and can be loaded from the external storage apparatus 206 onto the RAM 204 as necessary and used. Furthermore, the data can be disposed on a cache memory of the control unit 201 in a similar manner.

Figure 3:
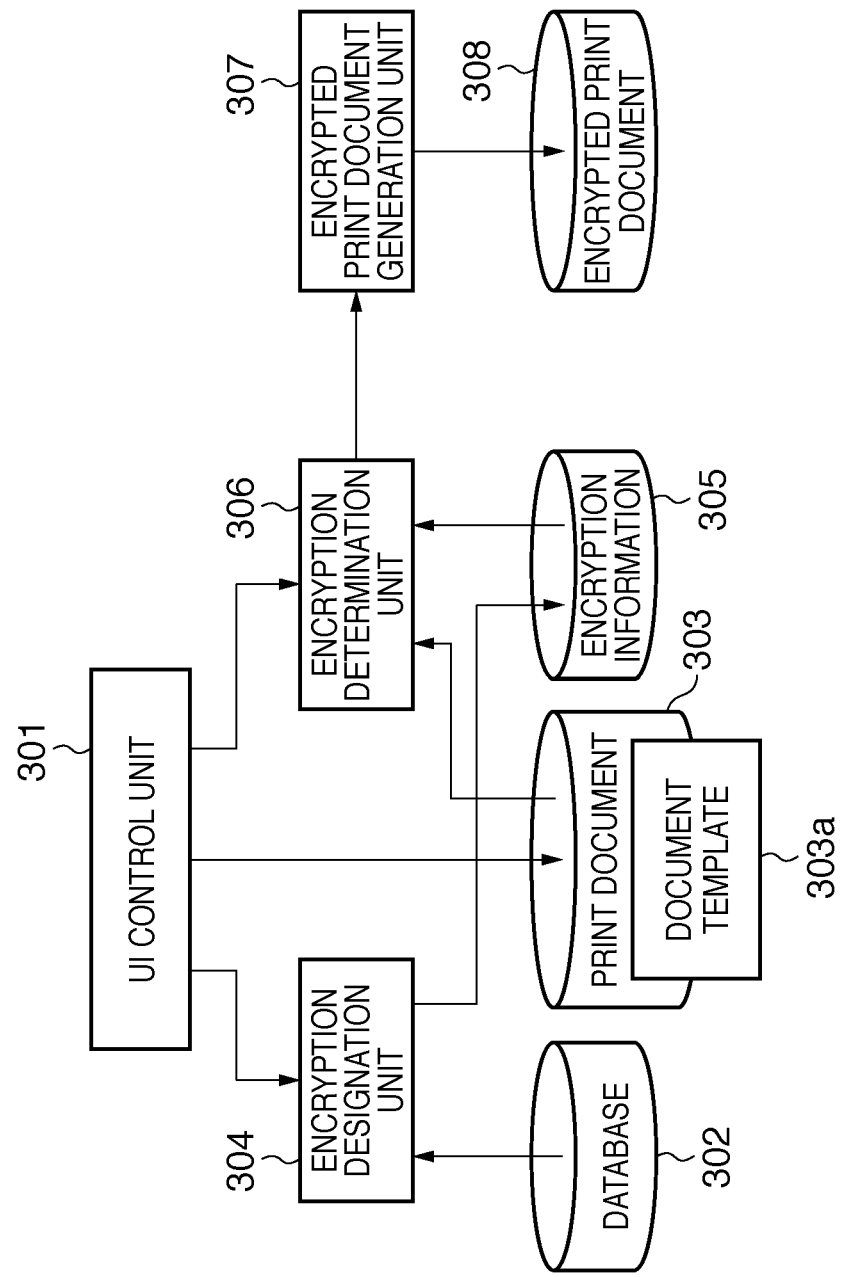
FIG. 3 is a data flow diagram relating to program code and data according to this embodiment.

FIG. 3 is a data flow diagram showing the relationship between program code and data handled in this embodiment. A UI control unit 301 handles data input via the input unit 203 in FIG. 2. A user can use the UI control unit 301 to give each processing unit an instruction to input data. Furthermore, the UI control unit 301 loads data in a database 302 and a print document 303 from the external storage apparatus 206 in FIG. 2 or the like and displays them on the display unit 202 in FIG. 2. The database 302 holds personal information and the like in the form of a table or the like. The print document 303 is configured from a document template 303a. The document template 303a contains layout information and information referring to the database 302. An encryption designation unit 304 operates upon receiving an instruction from the UI control unit 301 or the like. The encryption designation unit 304 stores content relating to encryption instructed by a user as encryption information 305. An encryption determination unit 306 determines whether or not to finally perform encryption based on the print document 303 and the encryption information 305. An encrypted print document generation unit 307 generates a print document with the content determined to be encrypted by the encryption determination unit 306. Then, the encrypted print document generation unit 307 outputs an encrypted print document 308 as the generated result.

The processing procedure following the flowchart described below is not limited to the examples shown in this embodiment. As long as the result of the present invention is satisfied, any procedures may be combined, a plurality of processes may be integrated, and a process may be separated into small parts. Furthermore, each process may be individually taken out and caused to function as a single process having one functional element, and may be used in combination with a process other than the processes described herein.

Hereinafter, an embodiment of the present invention will be described with reference to the drawings and flowcharts. FIG. 4 is an illustration of a data structure contained in the database 302 in FIG. 3. A data field 401 in the database 302 is configured from various items 403 to 413 such as ID, last_name, and first_name. The UI control unit 301 performs mapping of content data by designating the data field 401 from the document template 303a, and uses character strings or images registered in the database at the time of printing.

A record 402 indicates each record registered in the database. Regarding the content of each data field, for example, the item 403 is an ID for distinguishing a record. The item 404 indicates a last name of a customer. The item 405 indicates a first name of the customer. The item 406 indicates an address. The item 407 indicates a detailed portion of the address. The item 408 indicates the number of children of the customer if there is any. The item 409 indicates a name of a first child if there is a child. The item 410 indicates a name of a shop recently visited. The item 411 indicates the number of visits to the shop. The item 412 indicates an item recently bought. The item 413 indicates an advertisement as a recommendation for a customer. Here, the data structure shown herein is an example, that is, there is no limitation to the fields shown herein, and items can be added or deleted as necessary. Furthermore, a record is configured from pieces of content data of the respective items. For example, the first record (ID: 0001) is configured from a plurality of pieces of content data such as "Tanaka", "Ichiro", and "Tokyo".

Figure 5A:
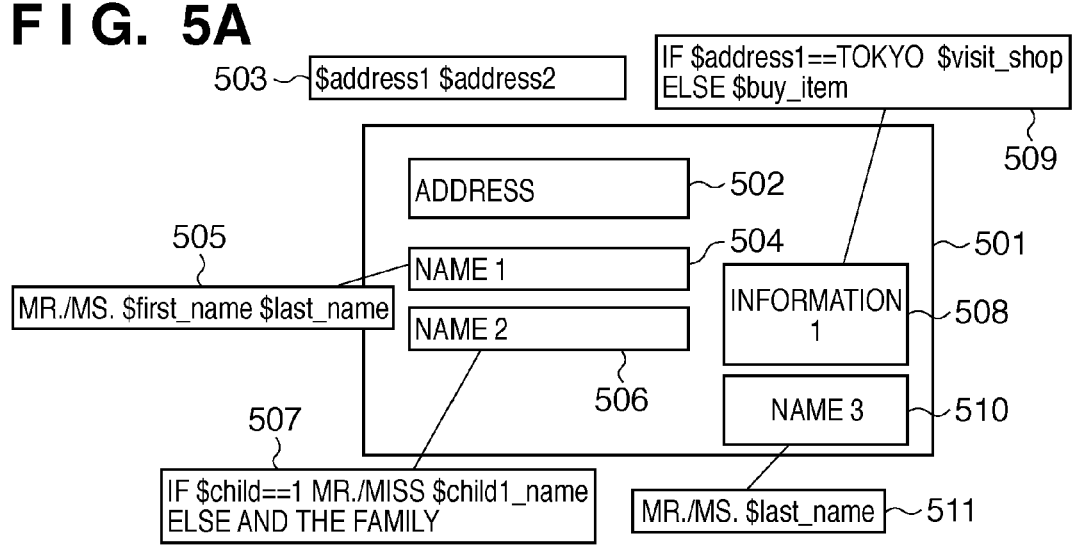
FIGS. 5A, 5B, and 5C are illustrations relating to a document template according to this embodiment.

FIG. 5A is an illustration of the document template 303a in FIG. 3. A work area 501 indicates an area that is to be used in the document template. A variable area 502 is an area to which content data relating to an address is inserted. Here, a rule is defined for each variable area, and content data in the database is inserted to the variable area according to the rule. Here, a rule for mapping to the variable area is referred to as a mapping rule or a rule. For example, a rule 503 designates to insert content data of the data fields $address1 and $address2 in the database 302 to the variable area 502, and defines to finally couple and print the content data of the data fields. A variable area 504 is an area to which content data relating to a name 1 is inserted, and the print content thereof is determined by a rule 505. The rule 505 defines to couple $last_name, $first_name, and the character string "Mr./Ms." and print them as the name 1. A variable area 506 is an area to which content data relating to a name 2 is inserted, and the print content thereof is determined by a rule 507. The rule 507 defines the condition "IF $child==1", and defines different printed results between the case where the condition is satisfied and the case where the condition is not satisfied. More specifically, it is defined to refer to the data field "$child" of a record that is to be processed, and to print "Mr./Miss $child1_name" if the content data is 1, or to print the character string "and the family" if not. Here, the mapping rule (or rule) herein refers to layout information described above.

A variable area 508 is an area to which content data relating to information 1 is inserted, and the print content thereof is determined by a rule 509. The rule 509 has the condition "IF $address1==Tokyo", and defines different printed results between the case where the condition is satisfied and the case where the condition is not satisfied. More specifically, it is defined to refer to the data field "$address1" of the record that is to be processed, and to print the content data of "$visit_shop" of the record that is to be processed, if the content data is Tokyo. Furthermore, it is defined to print the content data of "$buy_item" of the record that is to be processed, if not. A variable area 510 is an area to which content data relating to a name 3 is inserted, and the print content thereof is determined by a rule 511. The rule 511 defines to print the content data of "Mr./Ms. $last_name" of the record that is to be processed as the name 3. Here, the configurations of the areas and the rules corresponding to the variable areas described in this example are an example, and there is no limitation to these definitions and the configurations.

Figure 5B:
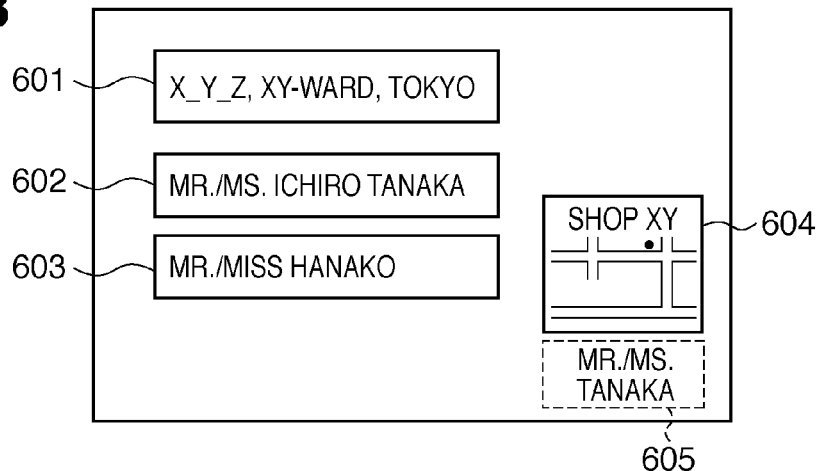
Figure 5C:
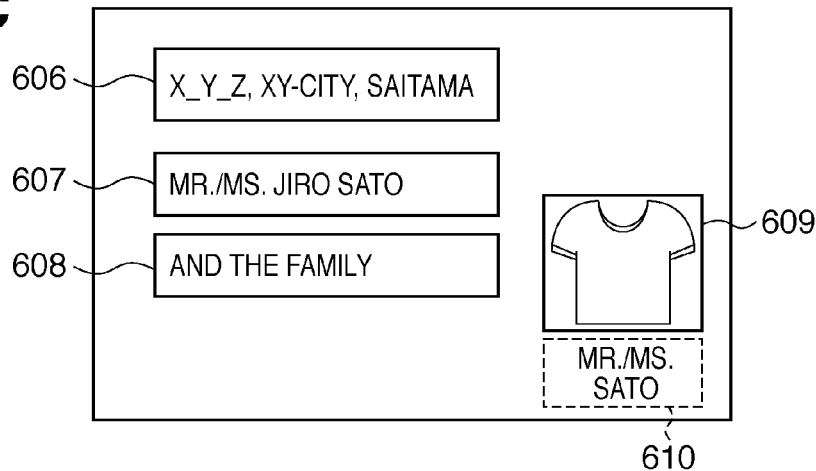

FIGS. 5B and 5C are illustrations showing that a printed result different for each record can be obtained in the case where the database 302 and the document template 303a described in FIGS. 4 and 5A are applied. FIG. 5B shows a printed result to which the first record of the record 402 in the database 302 in FIG. 4 has been applied, and FIG. 5C shows a printed result to which the second record of the record 402 in the database 302 in FIG. 4 has been applied. As shown in the diagrams, the content data of $address1 and $address2 of the first record is inserted to a variable area 601, and "X-Y-Z, XY-Ward, Tokyo" is printed as the address. The content data of $last_name and $first_name is inserted to a variable area 602, and "Mr./Ms. Ichiro Tanaka" is printed as the name 1. Since $child of the first record is 1, the content data of $child1_name is inserted to a variable area 603, and "Mr./Miss Hanako" is printed. Since $address1 is Tokyo when $address1 of the first record is referred to, the content data of $visit_shop is inserted to a variable area 604, and the content of image 2.JPG (a map image in this example) is printed as the shop information. The content data of $last_name of the first record is inserted to a variable area 605, and "Mr./Ms. Tanaka" is printed as the name 3.

The content data of $address1 and $address2 of the second record is inserted to a variable area 606, and "X-Y-Z, XY-City, Saitama" is printed as the address. The content data of $first_name and $last_name is inserted to a variable area 607, and "Mr./Ms. Jiro Sato" is printed as the name 1. Since $child is 2 when $child of the second record is referred to, "and the family" is printed in a variable area 608. Since $address1 is Saitama when $address1 of the second record is referred to, the content data of $buy_item is inserted to a variable area 609, and the content of image 1.JPG (an image of a T-shirt in this example) is printed. The content data of $last_name is inserted to a variable area 610, and "Mr./Ms. Sato" is printed as the name 3. When the database 302 and the document template 303a are linked in this manner, a printed result different for each record can be obtained.

FIG. 6 is a flowchart in the case where the UI control unit 301 in FIG. 3 gives the encryption designation unit 304 an instruction to generate an encryption designation screen. If an instruction to generate a screen for designating encryption is received from the UI control unit 301, in S102, the encryption designation unit 304 repeats S103 to S105 on all data fields used in the database 302. In S103, the encryption designation unit 304 adds a data field included in the database 302 to an encryption candidate. Referring to FIG. 4, the encryption designation unit 304 adds "ID", "first_name", "last_name", and the like to the encryption designation screen in the process of S103.

In S104, the encryption designation unit 304 determines whether or not a rule of a variable area defined in the document template uses the data field in a portion other than the condition. In S104, if the rule does not use the data field, the procedure advances to S106. In S104, if the rule uses the data field, the procedure advances to S105. In S105, the encryption designation unit 304 adds the rule to the encryption designation screen. In S106, if the processes of S103 to S105 end for all data fields, the encryption designation unit 304 causes the procedure to advance to S107. In S107, the encryption designation unit 304 generates an encryption designation screen based on the addition processes of S103 and S105. Then, the procedure advances to S108, and this sequence ends. More specifically, check boxes are generated such that encryption can be designated. Accordingly, an accepting unit from a user is realized.

Figure 7:
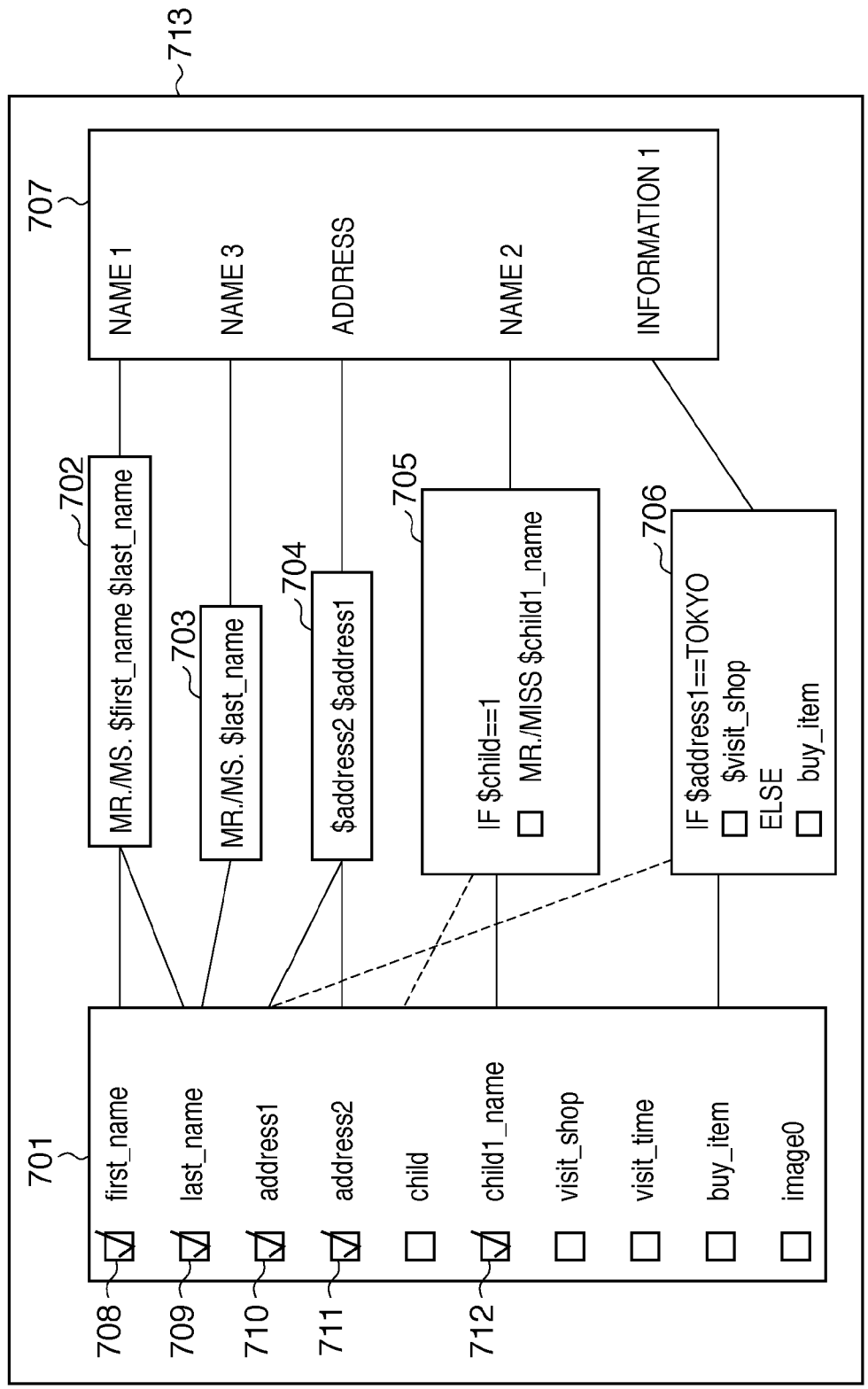
FIG. 7 is an illustration of an encryption designation screen according to this embodiment.

FIG. 7 is an illustration in the case where the user designates encryption using the encryption designation screen obtained by performing the flowchart in FIG. 6 on the document template 303a in FIG. 5A. Here, the configuration of the encryption designation screen shown herein is an example, and there is no limitation to the display method and the configuration thereof. In a data field list 701, each data field name in the database obtained in S103 is displayed. The user can designate encryption of variable areas using a data field by ticking a desired data field. Rules 702 to 706 indicate rules added in the process of S105. On the encryption designation screen in FIG. 7, the case where a data field is referred to and used as print data is indicated with a solid line, and the case where there is some relationship with (reference to) a data field is indicated with a broken line. Furthermore, in a rule 705, $child1_name is used as the result of "IF $child==1", and, thus, a check box is displayed such that encryption can be designated.

In a rule 706, $visit_shop and $buy_item are used as the result of "IF $address1==Tokyo" in a similar manner, and, thus, check boxes are respectively displayed. Here, in the template in FIG. 5A, the rule 507 includes "ELSE and the family", but this does not correspond to use of data of a data field, and, thus, the judgment result in S104 is No, so that "ELSE and the family" is not displayed in FIG. 7.

A variable area 707 is a variable area disposed in the document template, wherein a rule 702 is allocated to "name 1", a rule 703 is allocated to "name 3", a rule 704 is allocated to "address", the rule 705 is allocated to "name 2", and the rule 706 is allocated to "information 1". These constitute the encryption designation screen obtained by performing the flowchart in FIG. 6. It is shown that check boxes 708 to 712 are ticked by the user, that is, encryption is designated for the values of these data fields on the encryption designation screen. More specifically, encryption is designated for $first_name, $last_name, $address1, $address2, and $child1_name. An encryption designation screen 713 shows the entire encryption designation screen configured from the data field list 701, the rules 702 to 706, and the variable area 707.

FIG. 8 is a flowchart when finally generating the encrypted print document 308 after designating encryption. When the UI control unit 301 receives an instruction to output the encrypted print document 308, in S202, the encrypted print document generation unit 307 generates data necessary for encryption and decryption. In S203, the encryption determination unit 306 acquires all variable areas used in the document template 303a. In S204, the encryption determination unit 306 repeats S205 to S215 on all records used in the database 302. In S205, the encryption determination unit 306 repeats S206 to S214 on all variable areas. In S206, the encryption determination unit 306 acquires a rule allocated to a variable area. In S207, the encryption determination unit 306 repeats S208 to S211 on all data fields used in the rule.

In S208, the encryption determination unit 306 determines whether or not encryption is designated for a data field. This determination is realized by referring to an instruction result of the user operating the encryption designation screen in FIG. 7. If it is determined in S208 that encryption is not designated, the procedure advances to S212. If it is determined in S208 that encryption is designated, in S209, the encryption determination unit 306 determines whether or not the data field is used in a portion other than the condition in the rule. This determination is realized by referring to the rule of the document template. If it is determined in S209 that the data field is used only in the condition, the procedure advances to S212. If the data field is used in a portion other than the condition, in S210, the encryption determination unit 306 determines whether or not the data field is used in the case where the condition of the rule is satisfied by a current record. In S210, if the condition is not satisfied and the data field is not used, the procedure advances to S212. In S210, if the condition is satisfied and the data field is used, the procedure advances to S211 where the encrypted print document generation unit 307 encrypts the content data referred to by the data field, and sets alternative content as the reference destination instead of the encrypted content data. Here, if content data is encrypted, encrypted content is generated. Accordingly, the generation unit is realized.

In S212, if the processes end for all data fields used in the rule, the encryption determination unit 306 causes the procedure to advance to S213. In S213, the encryption determination unit 306 determines whether or not encrypted content is generated in the processes of S207 to S212. If it is determined in S213 that encrypted content is generated, the procedure advances to S215. If it is determined in S213 that encrypted content is not generated, in S214, the encrypted print document generation unit 307 generates normal content according to the rule. In S215, if the processes end for all variable areas, the encryption determination unit 306 causes the procedure to advance to S216. In S216, if the processes end for all records, the encryption determination unit 306 causes the procedure to advance to S217, and this sequence ends.

In this sequence, for example, if the user using FIG. 7 designates encryption, encryption is designated for $last_name in the rule 702 and the rule 703, and, thus, encryption is designated for variable areas to which the content data of last_name is inserted. Accordingly, simply by designating encryption of a data field, variable areas to which the content data is inserted by referring to the data field can be collectively encrypted, and incomplete designation can be reduced. Furthermore, in the rule 706, $address1 for which encryption is designated is referred to, but it is used only in the condition, and the content data of $address1 is not used at the time of printing. Accordingly, in S209, it is determined that encryption is not designated for the information 1 corresponding to the variable area. Accordingly, excessive encryption is prevented, and the layout information can be left unchanged. Furthermore, in the rule 705, if the second record in the database 302 in FIG. 4 is applied, in S210, $child is "2", and the result "and the family" that does not refer to the data field is obtained. Accordingly, the procedure does not advance to S211, encrypted content is not generated, and the layout information can be left unchanged.

Figure 9A:
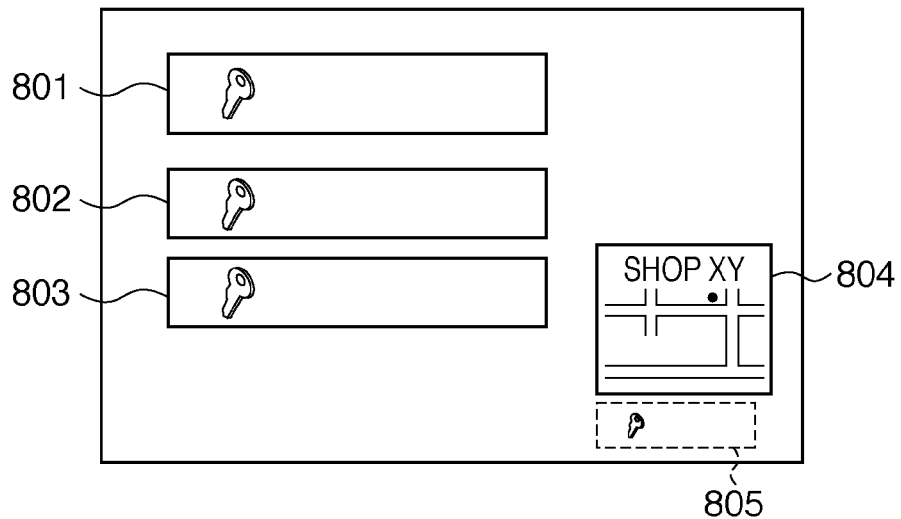
FIGS. 9A, 9B, and 9C are illustrations of a printed result in the case where decryption cannot be performed in this embodiment.
Figure 9B:
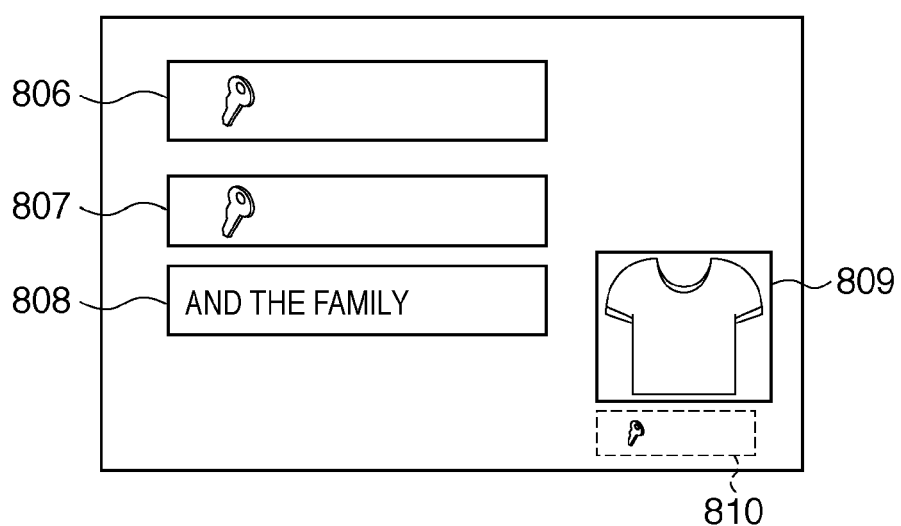
Figure 9C:
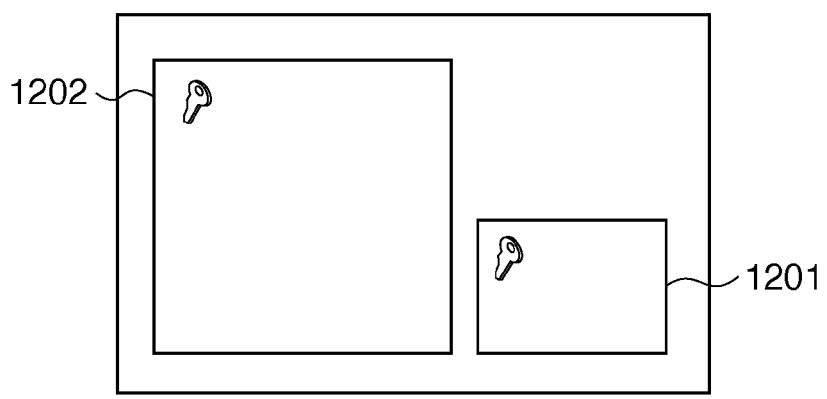

FIGS. 9A to 9C are illustrations of examples of printed results in the case where decryption cannot be performed after encryption is designated in FIG. 7. FIG. 9A is an illustration in the case where the first record in the database 302 in FIG. 4 is applied. FIG. 9B is an illustration in the case where the second record in the database 302 in FIG. 4 is applied. In FIG. 9A, a variable area 801 is a variable area for the address. Encryption is designated for $address1 and $address2 used in the rule 704, and, thus, the address cannot be printed as it is, and a state is shown in which alternative content is printed. A variable area 802 is a variable area for the name 1. Encryption is designated for $last_name and $first_name used in the rule 702, and, thus, the name 1 cannot be printed as it is, and a state is shown in which alternative content is printed. A variable area 803 is a variable area for the name 2. When the first record is used, the condition "$child==1" is satisfied in the rule 705, and the content data of $child1_name is used, and, thus, a state is shown in which alternative content is printed instead of the content data of the name 2. A variable area 804 is a variable area for the information 1. Here, $address1 is used in the rule 706 but is used only in the condition, and, thus, a state is shown in which the content data inserted from the database is printed as it is without performing encryption. A variable area 805 is a variable area for the name 3. Encryption is designated for $last_name used in the rule 703, and, thus, a state is shown in which alternative content is printed instead of the content data of the name 3.

In FIG. 9B, the record that is to be processed of variable areas 806, 807, 809 and 810 is simply changed to the second record and the result is the same, and, thus, a description thereof has been omitted. A variable area 808 is a variable area for the name 2. In the second record, the condition "$child==1" is not satisfied in the rule 705, and the content data of $child1_name of the second record is not used. Accordingly, a state is shown in which "and the family" is printed as it is. Here, alternative content is indicated with an image of a key, but this is not a limitation, and other content may be used as the alternative content.

FIG. 10 is an illustration of the encrypted print document 308 in FIGS. 9A and 9B. Specific output of the encrypted print document 308, authentication for acquiring decryption data, and the like are well known, and, thus, a description thereof has been omitted. Areas 901 to 905 are portions regarding the first record in the database 302 in FIG. 4, and areas 906 to 910 are portions regarding the second record. Here, an object on which encryption has been performed is referred to as an encrypted object. The area 901 shows that, if there is decryption data for the address, addr_1.data referred to by the encrypted object is decrypted. Furthermore, if the encrypted content generated in S211 cannot be decrypted, that is, if decryption cannot be performed because decryption data for decryption generated in S211 cannot be acquired due to an authentication failure or the like, the alternative object "proxy.pdf" is used. The area 902 shows that, if there is decryption data for the name 1, name1_1.data referred to by the encrypted object is decrypted. Furthermore, it is shown that, if the encrypted content generated in S211 cannot be decrypted, the alternative object "proxy.pdf" is used. The area 903 shows that, if there is decryption data for the name 2, name2_1.data referred to by the encrypted object is decrypted. Furthermore, it is shown that, if the encrypted content generated in S211 cannot be decrypted, the alternative object "proxy.pdf" is used. The area 904 shows that the normal "content map_1.pdf" generated in S214 is used as the information 1. The area 905 shows that, if there is decryption data for the name 3, name3_1.data referred to by the encrypted object is decrypted. Furthermore, it is shown that, if the encrypted content generated in S211 cannot be decrypted, the alternative object "proxy.pdf" is used.

Here, the areas 906 to 910 are basically the same as the areas 901 to 905, and, thus, a description thereof has been omitted. Furthermore, the area 908 shows that the normal content "and the family.pdf" generated in S214 is used as the name 2.

As described above, simply by designating a data field in the database, variable areas that are to be encrypted can be collectively designated, and incomplete designation can be reduced. Furthermore, it is possible to encrypt all variable areas that are to be encrypted, without changing the layout information. Furthermore, designation for encryption can be performed in the unit of a data field, and, thus, if a data field is used in a plurality of variable areas, encryption can be designated at a time, and the efficiency can be improved. Since only portions that have to be encrypted are encrypted, more layout information can be left unchanged. Furthermore, since only portions that have to be encrypted are encrypted, even in the case where decryption is performed, the time for decryption can be shortened.

Second Embodiment

The first embodiment in the present invention showed that encryption can be designated for a plurality of variable areas at a time by designating a data field in the database. However, if a data field is not referred to in a variable area, the data field cannot be designated for encryption. Furthermore, encryption cannot be controlled in detail in the unit of an image or a character string actually referred to.

Figure 11:
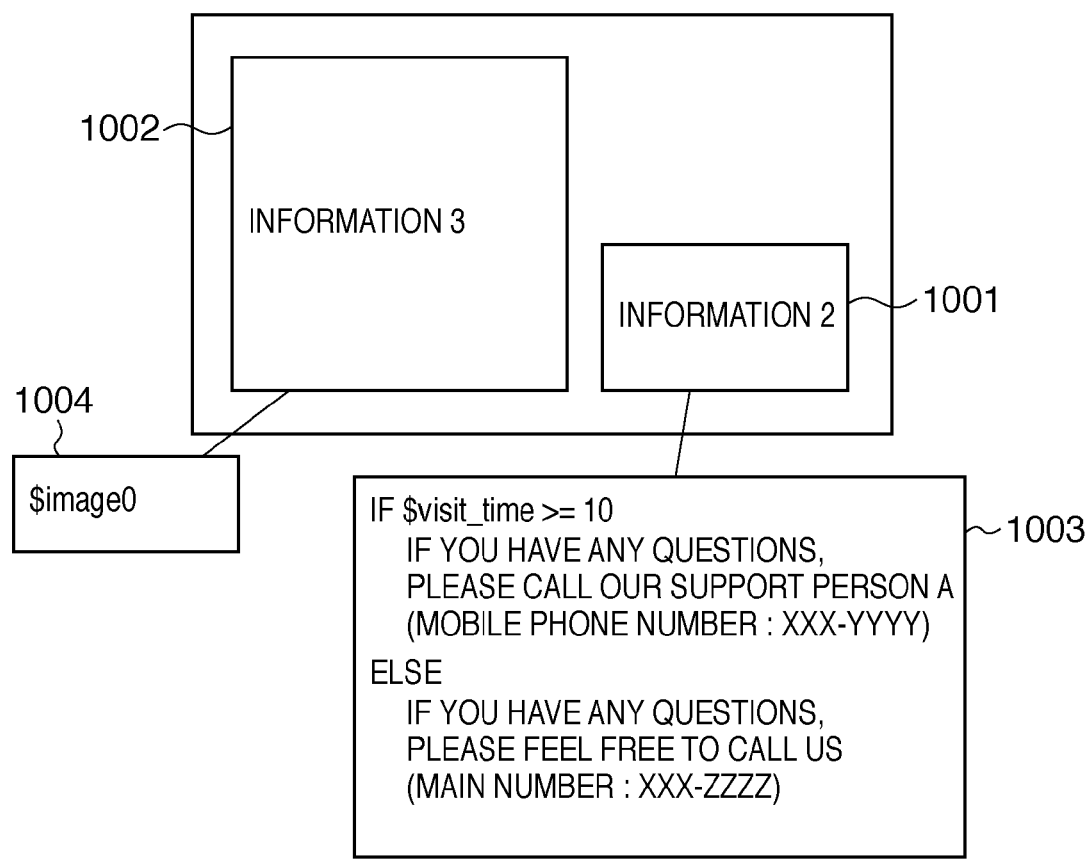
FIG. 11 is an illustration relating to a document template according to a second embodiment.

FIG. 11 is an illustration of the document template 303a. A variable area 1001 is a variable area relating to information 2. The content data inserted to the variable area 1001 is determined by a rule 1003. According to the rule 1003, the content data of content that varies depending on the condition "IF $visit_time>=10" in the rule is inserted. In the first embodiment, the content data inserted to the variable area 1001 is not the content data of a data field regardless of whether or not the condition is satisfied, and, thus, the variable area 1001 is not selected as an encryption candidate. A variable area 1002 is a variable area relating to information 3. It is defined to insert the content data of the data field "$image0" in the database 302 to the variable area 1002 according to a rule 1004. In the first embodiment, even in the case where a variable area refers to data different for each record as $image0, designation can be performed only on whether or not to encrypt all records. Accordingly, in the first embodiment, also in the case of a record that does not have to be encrypted, if there is even one content that is to be encrypted, as a result, all records are encrypted.

Figure 12:
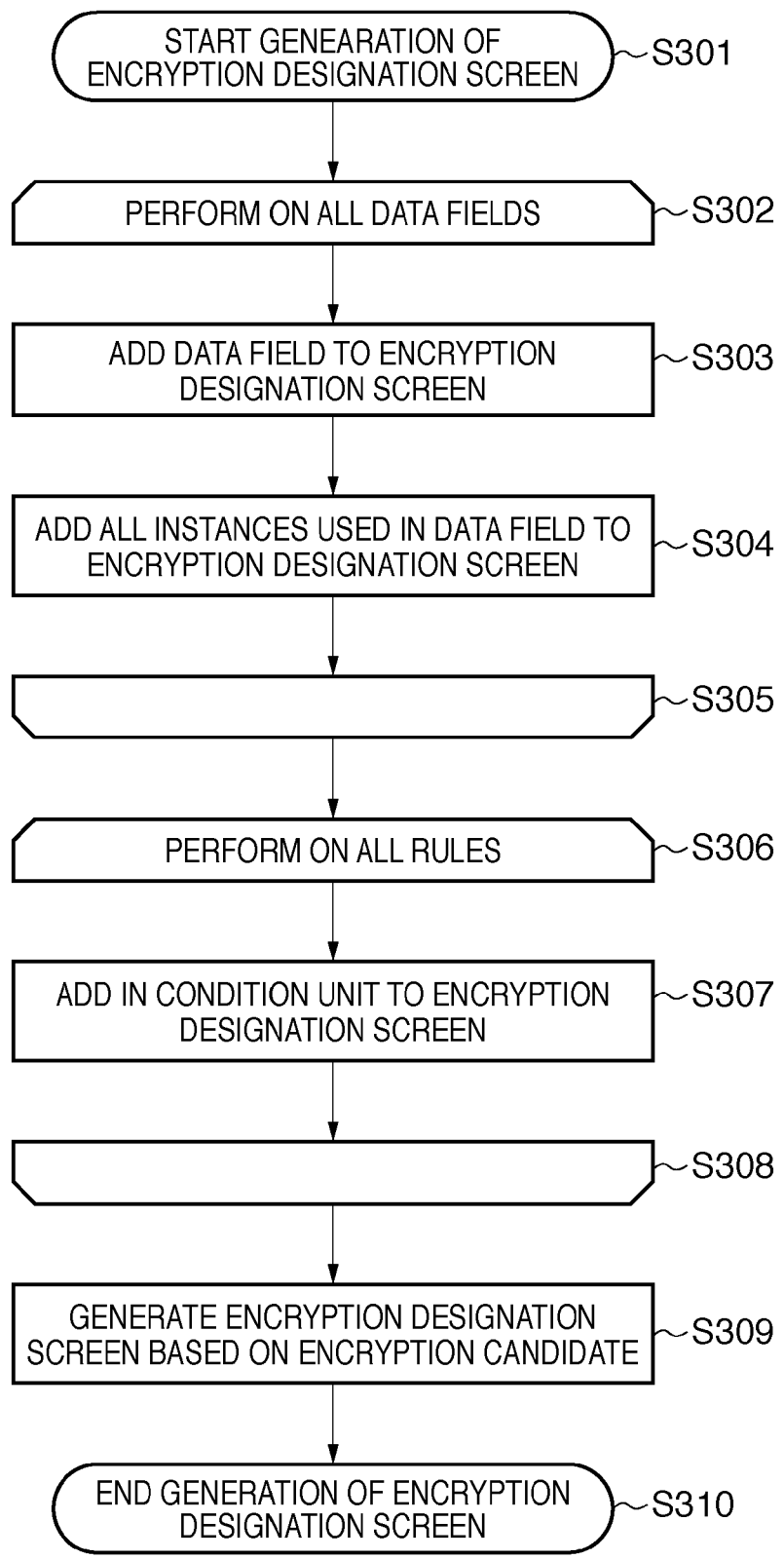
FIG. 12 is a flowchart relating to generation of an encryption designation screen according to the second embodiment.

FIG. 12 is a flowchart in the case where the UI control unit 301 in FIG. 3 gives the encryption designation unit 304 an instruction to generate an encryption designation screen in this embodiment. When the encryption designation unit 304 receives an instruction to generate a screen for designating encryption from the UI control unit 301, in S302, the encryption designation unit 304 repeats S303 and S304 on all data fields used in the database 302. In S303, the encryption designation unit 304 adds a data field to the encryption designation screen. In S304, the encryption designation unit 304 adds all instances of each record used in the data field to the encryption designation screen. In S305, if the processes end for all data fields, the procedure advances to S306.

In S307, the encryption designation unit 304 adds a unit of combination of a condition and a result to the encryption designation screen regardless of whether or not a data field is referred to with respect to all rules. In S308, if the encryption designation unit 304 adds units of combination of a condition and a result to the encryption designation screen with respect to all rules, the procedure advances to S309, and this sequence (S306~S308) ends. More specifically, check boxes are displayed such that encryption can be designated. In S309, an encryption screen is generated based on the added encryption candidates. Then, this process flow ends.

Figure 13:
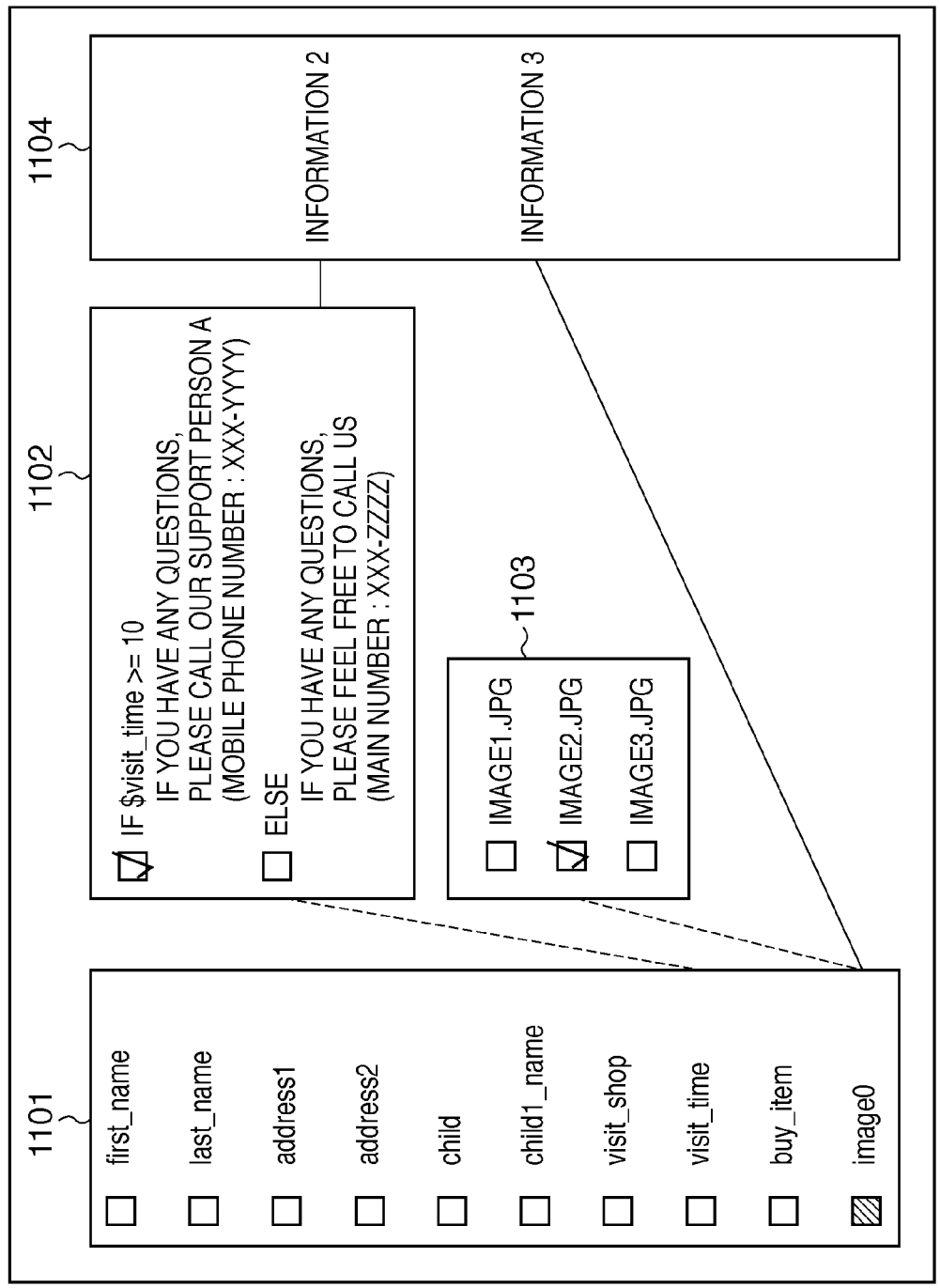
FIG. 13 is an illustration of an encryption designation screen according to the second embodiment.

FIG. 13 is an illustration in the case where the user designates encryption using the encryption designation screen obtained by performing the flowchart in FIG. 12 on the document template 303a in FIG. 11. Here, the encryption designation screen shown herein is an example, and the configuration and the display method are not limited. An area 1101 is a list of data fields. The user can designate encryption of variable areas using a data field by ticking the data field. A rule 1102 indicates a rule allocated to variable areas. On the encryption designation screen, the case where a data field is referred to and used as print data is indicated with a solid line, and the case where a data field is referred to in a condition is indicated with a broken line. The rule 1102 designates to encrypt corresponding information, if the condition "IF $visit_time>=10" is satisfied, and can designate encryption even in the case where the content data of a data field is not inserted. A state is shown in which, according to a rule 1103, whether or not to perform encryption is defined in the unit of "image 1.JPG", "image 2.JPG", and "image 3.JPG", which are actual instances defined for each record of the data field "$image0". An area 1104 is a list of variable areas. It is shown that, in the information 3 of the area 1104, $image0 is used, but "image 2.JPG" is ticked so as to designate encryption, and, thus, a variable area is encrypted only when "image 2.JPG" is used.

Figure 14:
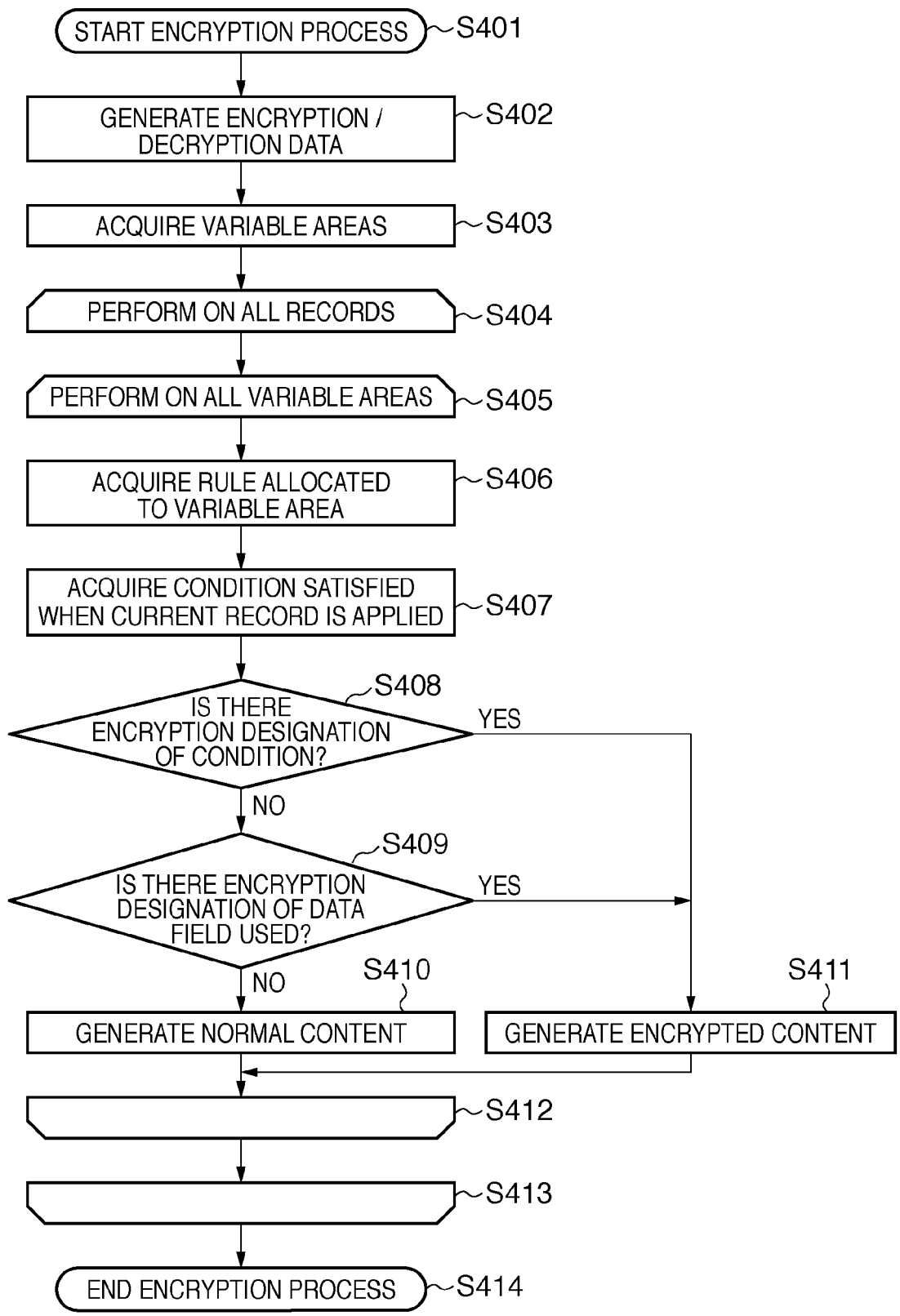
FIG. 14 is a flowchart relating to generation of a print document according to the second embodiment.

FIG. 14 is a flowchart when finally generating the encrypted print document 308 after designating encryption.

When the UI control unit 301 receives an instruction to output the encrypted print document 308, in S402, the encrypted print document generation unit 307 generates data necessary for encryption and decryption. In S403, the encryption determination unit 306 acquires all variable areas used in the document template 303a. In S404, the encryption determination unit 306 repeats S405 to S412 on all records used in the database 302. In S405, the encryption determination unit 306 repeats S406 to S411 on all variable areas. In S406, the encryption determination unit 306 acquires a rule allocated to a variable area or a data field referred to in a variable area. In S407, the encryption determination unit 306 acquires a condition satisfied when a currently processed record (hereinafter, referred to as a "current record") is applied, and a result value thereof.

In S408, the encryption determination unit 306 determines whether or not there is designation for encryption in a combination of the condition satisfied in S407 and the result thereof. If it is determined in S408 that there is designation for encryption, the procedure advances to S411. If it is determined in S408 that there is not designation for encryption, the procedure advances to S409. For example, in the case of the rule 1102 in FIG. 13, if the first record in the database in FIG. 4 is the current record, in S407, since $visit_time is "20", the condition "IF $visit_time>=10" is satisfied. As a result, "IF you have any questions, please call our support person A (mobile phone number: XXX-YYYY)" is acquired. In S408, since encryption is designated for the condition satisfied by the current record as designated in the rule 1102 in FIG. 13, the procedure advances to S411. In S409, the encryption determination unit 306 determines whether or not a data field is present in a result portion actually used in printing among the conditions satisfied in S407, and whether or not there is designation for encryption of the data field. If it is determined in S409 that there is designation for encryption, the procedure advances to S411. If it is determined in S409 that there is not designation for encryption, the procedure advances to S410. For example, in the case of the rule 1103 in FIG. 13, if the first record in the database 302 in FIG. 4 is the current record, in S409, since there is designation for encryption of "image 2.JPG", the procedure advances to S411. In S410, the encrypted print document generation unit 307 generates normal content according to the rule. In S411, the encrypted print document generation unit 307 encrypts the content, and sets alternative content. In S412, if the processes end for all variable areas, the encryption determination unit 306 causes the procedure to advance to S413. In S413, if the processes end for all records, the encryption determination unit 306 causes the procedure to advance to S414, and this sequence ends.

FIG. 9C is an illustration of a printed result to which the first record in the database 302 in FIG. 4 has been applied in the case where decryption cannot be performed after encryption is designated in FIG. 13. A variable area 1201 is a variable area for the information 2. In the variable area 1201, encryption is applied, and a state is shown in which alternative content is printed. A variable area 1202 is a variable area for the information 3. In the variable area 1202, encryption is applied, and a state is shown in which alternative content is printed.

As described above, even in the case where a data field is not referred to, designation for encryption can be performed in the unit of a condition of a rule. Furthermore, even in the case where a different instance is used for each record, designation for encryption can be performed in the unit of the instance. That is to say, encryption can be designated in the unit of a condition of a rule, and, even in the case where a data field is not referred to in a rule, encryption is designated for a variable area, and incomplete designation for encryption can be reduced. Furthermore, encryption can be designated in the unit of an instance used in the database, and, in the case where a different instance is used for each record, encryption can be designated in detail for each record, and much layout information can be left unchanged.

Third Embodiment

Figure 15:
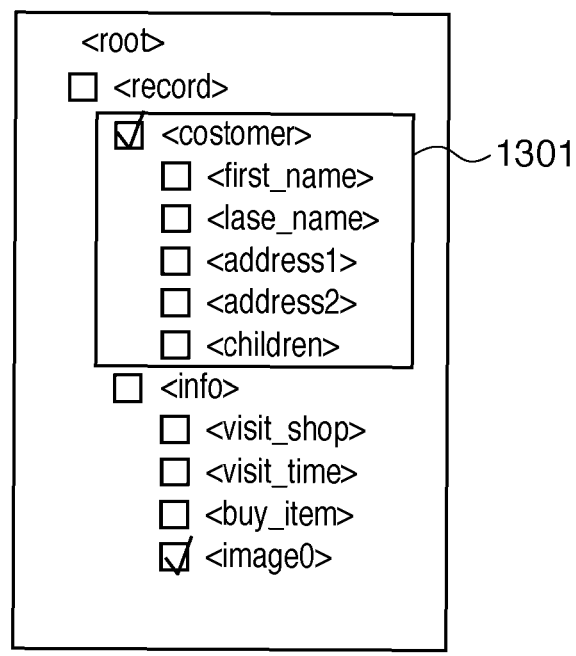
FIG. 15 is an illustration relating to encryption designation on a tree-structure database according to this embodiment.

The first embodiment or the second embodiment was described based on the assumption that the database is a simple two-dimensional table, but the same can be applied also to the case where the database has a tree structure having a parent-child relationship such as an XMLDB. FIG. 15 is an illustration in the case where encryption is designated for a database that can be expressed in the form of a tree structure. An area 1301 shows that encryption is designated for a Customer element that is part of the database. The Customer element is taken as a parent element, and first_name, last_name, address1, address2, and children elements exist as the child elements. That is to say, it is expressed that elements corresponding to the first record in the database described in FIG. 4 are present as the child elements of the Customer element. Furthermore, in the case where such a parent-child relationship exists, if the parent element is ticked for designation for encryption, encryption is designated also for the child elements in a similar manner. Here, also in the case where the tree structure is configured in a further stepwise manner, this can be applied to lower-level elements positioned at lower levels, such as child elements or grandchild elements.

As described above, in the case of a database having a parent-child relationship, simply by designating a parent element, encryption of child elements can also be efficiently designated at a time, and designation for encryption can be more easily set. More specifically, this configuration is realized such that if encryption is designated for a parent element, encryption is designated also for child elements thereof.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-254451, filed Nov. 5, 2009, which is hereby incorporated by reference herein in its entirety.

What is claimed is:

1. An information processing apparatus that maps a data field in a database to a variable area of a document template, the information processing apparatus comprising:

a generating unit configured to generate a screen including a plurality of accepting areas for a plurality of data fields in the data base;

an accepting unit configured to accept designation, via the accepting areas of the generated screen, from a user regarding whether or not to perform encryption for each data field;

an encryption unit configured to encrypt content data of the data fields for which encryption designation is accepted by the accepting unit; and a display control unit configured to display an alternative content of the encrypted content in the variable area that the data field of the encryption designation is mapped to, and to display a content of a first record in an area that a data field not designated for the encryption is mapped to, wherein when the first record is changed to a second record, the display control unit displays the alternative content in the variable area that the data field of the encryption designation is mapped to, and displays a content of the second record in the area that the data field not designated for the encryption is mapped to.

2. The information processing apparatus according to claim 1, wherein the encryption unit determines not to encrypt the content that is to be applied to the variable area, in a case where the data field is referred to as a condition for applying the content to the variable area in a mapping rule.

3. The information processing apparatus according to claim 1,
wherein the accepting unit further accepts designation from a user regarding whether or not to perform encryption for each condition of a mapping rule, and
the encryption unit determines to encrypt the content that is to be applied to the variable area for which the mapping rule is defined, in a case where the condition designated by the accepting unit is satisfied.

4. The information processing apparatus according to claim 1,
wherein the accepting unit accepts designation regarding whether or not to perform encryption for each instance, which is content that is to be applied to the variable area, in a case where a mapping rule is applied to all records, and
the encryption unit determines whether or not to encrypt the instance that is to be applied to the variable area and that is designated by the accepting unit.

5. The information processing apparatus according to claim 1,
wherein the data field is expressed in a tree structure in the database, and
the encryption unit determines, according to the data field designated by the accepting unit, to encrypt a data field that is a lower-level element of the data field in the tree structure as content that is to be applied to the variable area referred to by a mapping rule.

6. A method for controlling an information processing apparatus that maps a data field in a database to a variable area of a document template, the method comprising the steps of:
generating a screen including a plurality of accepting areas for a plurality of data fields in the database;
accepting designation, via the accepting areas of the generated screen, from a user regarding whether or not to perform encryption, for each data field;
encrypting content data of the data fields for which encryption designation is accepted in the accepting step; and
displaying an alternative content of the encrypted content in the variable area that the data field of the encryption designation is mapped to, and displaying a content of a first record in an area that a data field not designated for the encryption is mapped to, wherein when the first record is changed to a second record, the alternative content is displayed in the variable area that the data field of the encryption designation is mapped to, and a content of the second record is displayed in the area that the data field not designated for the encryption is mapped to.

7. A non-transitory computer-readable medium storing a program for causing a computer to function as:
a generating unit configured to generate a screen including a plurality of accepting areas for a plurality of data fields in the data base;
an accepting unit configured to accept designation, via the accepting areas of the generated screen, from a user regarding whether or not to perform encryption, for each data field;
an encryption unit configured to encrypt content data of the data fields for which encryption designation is accepted by the accepting unit; and
a display control unit configured to display an alternative content of the encrypted content in the variable area that the data field of the encryption designation is mapped to, and to display a content of a first record in an area that a data field not designated for the encryption is mapped to,
wherein when the first record is changed to a second record, the display control unit displays the alternative content in the variable area that the data field of the encryption designation is mapped to, and displays a content of the second record in the area that the data field not designated for the encryption is mapped to.

8. The method according to claim 6, wherein, in the encryption step, it is determined not to encrypt the content that is to be applied to the variable area, in a case where the data field is referred to as a condition for applying the content to the variable area in a mapping rule.

9. The method according to claim 6,
wherein, in the accepting step, further designation from a user regarding whether or not to perform encryption for each condition of a mapping rule is accepted, and
in the encryption step, it is determined to encrypt the content that is to be applied to the variable area for which the mapping rule is defined, in a case where the condition designated in the accepting step is satisfied.

10. The method according to claim 6,
wherein in the accepting step, designation regarding whether or not to perform encryption for each instance is accepted, which is content that is to be applied to the variable area, in a case where a mapping rule is applied to all records, and
in the encryption step, it is determined whether or not to encrypt the instance that is to be applied to the variable area and that is designated in the accepting step.

11. The method according to claim 6,
wherein the data field is expressed in a tree structure in the database, and
in the encryption step, it is determined, according to the data field designated in the accepting step, to encrypt a data field that is a lower-level element of the data field in the tree structure as content that is to be applied to the variable area referred to by a mapping rule.

12. The non-transitory computer-readable medium according to claim 7, wherein the encryption unit determines not to encrypt the content that is to be applied to the variable area, in a case where the data field is referred to as a condition for applying the content to the variable area in a mapping rule.

13. The non-transitory computer-readable medium according to claim 7,
- wherein the accepting unit further accepts designation from a user regarding whether or not to perform encryption for each condition of a mapping rule, and
- the encryption unit determines to encrypt the content that is to be applied to the variable area for which the mapping rule is defined, in a case where the condition designated by the accepting unit is satisfied.

14. The non-transitory computer-readable medium according to claim 7,
- wherein the accepting unit accepts designation regarding whether or not to perform encryption for each instance, which is content that is to be applied to the variable area, in a case where a mapping rule is applied to all records, and
- the encryption unit determines whether or not to encrypt the instance that is to be applied to the variable area and that is designated by the accepting unit.

15. The non-transitory computer-readable medium according to claim 7,
- wherein the data field is expressed in a tree structure in the database, and
- the encryption unit determines, according to the data field designated by the accepting unit, to encrypt a data field that is a lower-level element of the data field in the tree structure as content that is to be applied to the variable area referred to by a mapping rule.

* * * * *